INVENTOR.

BY Glen Peterson

INVENTOR.

BY Glen Peterson

Jan. 29, 1957 G. PETERSON 2,779,867

APPARATUS FOR CONNECTING CIRCUIT ELEMENTS TO ELECTRONIC TUBE SOCKET

Original Filed Sept. 21, 1949 3 Sheets-Sheet 3

INVENTOR.

BY Glen Peterson

United States Patent Office 2,779,867

Patented Jan. 29, 1957

2,779,867

APPARATUS FOR CONNECTING CIRCUIT ELEMENTS TO ELECTRONIC TUBE SOCKET

Glen Peterson, Tulsa, Okla.

Original application September 21, 1949, Serial No. 117,056, now Patent No. 2,647,990, dated August 4, 1953. Divided and this application January 12, 1953, Serial No. 330,717

4 Claims. (Cl. 250—16)

This invention relates to attachments for and improvements in electronic tube sockets and in the means and methods of connecting electronic circuit elements to said tube sockets and supporting them therefrom, being a division of my original application, Serial No. 117,056, filed September 21, 1949, now Patent 2,647,990 issued August 4, 1953.

An electronic circuit element in considered to consist primarily of the passive lumped impedance elements of resistance, capacitance and inductance; and secondarily, of such active elements as small bias batteries, crystal rectifiers, piezo-electric elements, etc. Circuit elements thus encompass many types and sizes of parts which enter into the circuit external to the electronic vacuum tube. As broadly construed, my invention provides both insulating and conducting nodular supports for electronic circuit elements. These supports, or platforms as I have chosen to call them, are made integral parts of electronic tube sockets and are caused to blend or fit into the geometry of tube, socket and circuit elements in such a way that largely the lumped impedance values of the circuit element are active in the circuit while to a great extent the unwanted accessory impedances of the circuit elements are inactive in the circuit. By accessory impedances is meant the distributed capacitance, inductance and to some extent resistance of circuit elements and associated supporting structures due to their finite lengths and surfaces.

As the frequencies of the applied radio spectrum go higher and higher the construction and inter-connection of lumped circuit elements with electronic tubes becomes increasingly difficult. The point is finally reached in the radio frequency spectrum where pure lumped impedances of a desired variety cannot be obtained and circuit elements having distributed parameters must be employed. At the same time, the physical dimensions of circuit elements having distributed parameters are often so large as to not readily meet the practical requirements of size in the upper V. H. F. and lower U. H. F. bands. Thus, there is a region in the now useable radio frequency spectrum between about 50 and 800 megacycles in which circuit mechanics is a limiting factor. In this region the lumped impedance elements so useful at lower frequencies do not generally give optimum results, and circuit elements having distributed parameters are yet too bulky to apply.

The primary purpose of this invention is to provide means whereby the use of lumped circuit elements can be extended far into the U. H. F. band, and even in some instances into the S. H. F. band of the radio frequency spectrum. At the same time, it is an object of this invention to make the facilities thus provided for the higher frequency regions useful in the lower frequency portions of the radio frequency spectrum, the V. H. F., H. F., M. F. and L. F. bands, and even at audio frequencies, in conserving space and in conveniently securing lumped impedance elements directly to electronic tube sockets. A third object is to provide a ready means for localizing or insulating ground potential reference points from the main chassis, when it is desirable to so do. A fourth object is to provide the means of constructing stage by stage subassemblies which meet the foregoing objectives.

As generally accepted, the above described radio bands of the radio frequency spectrum are defined as follows:

| | | |
|---|---|---|
| S. H. F. | megacycles | 3,000 to 30,000 |
| U. H. F. | do | 300 to 3,000 |
| V. H. F. | do | 30 to 300 |
| H. F. | do | 3 to 30 |
| M. F. | kilocycles | 300 to 3,000 |
| L. F. | do | 30 to 300 |
| V. L. F. | do | 3 to 30 |
| Audio | cycles | 30 to 30,000 |

In the application of electronic tubes to V. H. F. and U. H. F. bands, there is an acute need for the most intimate possible relationship between certain tube elements and one or more by-pass and/or coupling condensers. At the same time, there is an equally stringent requirement for the most direct possible connection between by-pass and coupling condensers and biasing and coupling resistors. This usually requires that the connections between tube and circuit elements, have minimum inductance; and this, in turn, implies the shortest possible conductor lengths as well as minimum separation of and symmetry between conductors carrying equal and oppositely directed currents.

Again, the inductors and capacitors forming tuned circuits in the V. H. F. and U. H. F. bands must be connected to each other and to the applicable tube socket terminals with the shortest possible conductor lengths so that these inter-connecting wires have minimum resistance, capacitance and inductance. This, in turn, often requires that tube sockets be placed as close together as possible, a condition which can only be met by making proper provision for the associated circuit elements.

Another problem to be met is the shielding requirement, the difficulty of which increases with increasing frequency. It becomes especially acute when the wave length of currents flowing in shields and chassis become commensurate with the dimension of the shields, chassis, circuit elements and conductors. These difficulties are preponderantly due to the fact that when the chassis and shields become appreciable fractions of a wave length of the currents flowing in the apparatus of which they are a part, equipotential surfaces in chassis and shields can no longer be obtained. Thus, it becomes impractical to consider chassis and shields as equipotential surfaces to which circuit elements can be "grounded" at any convenient point; rather "grounding" points must be appropriately chosen so that unwanted chassis and shield currents do not flow between circuits introducing undesirable couplings.

Usually a chassis point is chosen in the vicinity of each electronic tube and this point is considered to be the "ground" point for the circuit elements applicable to that tube. Even then, unless parts are widely spaced on a chassis, considerable trouble is had in avoiding the flow of chassis currents from circuit to circuit. Too, it is often mechanically inconvenient to tie many circuit elements to a single point on a chassis. Accordingly, and as previously stated, it is an object of this invention to provide means whereby circuit elements grouped with each electronic tube may be conveniently grounded to a highly conductive central surface whose dimensions are small compared with the wave length of the current employed, and which is insulated from the chassis and may, therefore, remain so, or may be conductively connected to the chassis as requirements dictate.

On the other hand, there are in use a wide variety of electronic tubes and, consequently, several types of tube sockets as well as a great variety of tube socket terminal connections to electronic tube elements. One tube using a particular type of socket may have the cathode connected to lug 2; another to lug 5; and still another to lug 8. Similar orientations prevail for control grids, plates, screen grids, suppressors, etc. As a matter of fact, tubes exist having a great many of all possible permutations and combinations of tube elements to base pin connections.

The foregoing limitations together with the many applications to which electronic tubes are put, make it difficult to apply a fixed scheme of interconnecting tube and circuit elements. It is, therefore, a fifth object of this invention to provide highly flexible means whereby these limitations can be economically and conveniently met in all types of applications, and whereby the changing of circuit elements in experimental work, and in repair, is greatly facilitated.

These and other objects and advantages will be understood from the following detailed description taken in connection with the accompanying drawings, wherein:

Figure 1 is a schematic circuit diagram of a typical electronic tube amplifier.

Figure 2*a* is a top plan view of the tube socket used in practicing my invention.

Figure 2*b* is a view in elevation and partial section of the tube socket of Figure 2*a*.

Figure 2*c* is a bottom plan view of the same tube socket.

Figure 3*a* is a view in elevation of the preferred form of circuit element platform.

Figure 3*b* is a plan view of the same circuit element platform as shown in Figure 3*a*.

Figure 4*a* is a drawing in elevation and partial section which shows the tube socket and circuit element platform combined with typical circuit elements in place.

Figure 4*b* is a plan view of the same combination of tube socket, platform, and circuit elements, as shown in Figure 4*a*.

Figure 5*a* is a drawing in elevation and partial vertical section of an alternative form of circuit element platform.

Figure 5*b* is a plan view of the platform of Figure 5*a*.

Figure 6 is a drawing showing another combination of a circuit element platform, tube sockets and circuit elements.

Figure 7*a* is a drawing in elevation of a basic form of circuit element platform.

Figure 7*b* is a plan view of the platform of Figure 7*a*.

Figure 11*a* is a drawing in elevation illustrating the application of a fourth form of circuit element platform with pedestal and table combined into a single block of material.

Figure 11B:
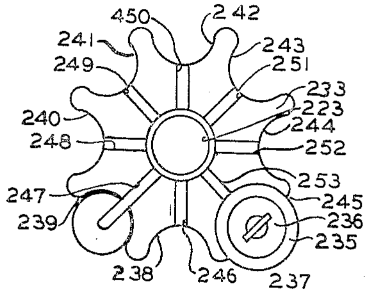
Figure 11D:
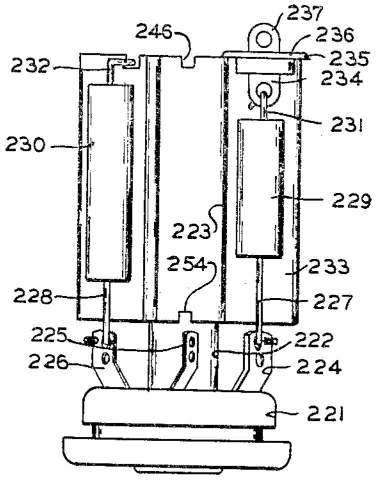

Figure 11*b* is a plan view of the arrangement of Figure 11*a*.

Figure 12:
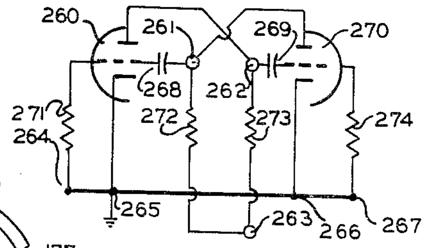

Figure 12 is a schematic circuit diagram of a typical multi-vibrator circuit.

Figure 13:
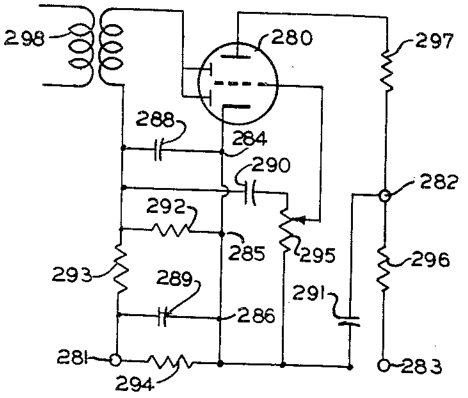

Figure 13 is a schematic circuit diagram of a typical second detector and first audio amplifier.

Figure 14:
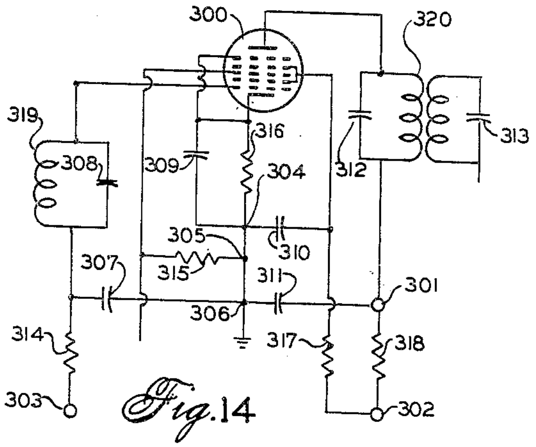

Figure 14 is a schematic circuit diagram of a typical mixer circuit.

Figure 1:
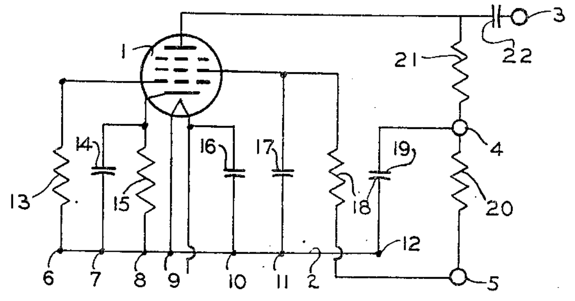

Considering the drawings in detail, in Figure 1, I have shown an electronic amplifier circuit using a pentode 1, having a ground potential reference plane 2, insulated nodal support points 3, 4, and 5, conducting nodal support point 6, 7, 8, 9, 10, 11, and 12. Between the terminal lugs of the tube, the conducting nodes of the ground plane and the insulated nodes, the required circuit elements 13, 14, 15, 16, 17, 18, 19, 20, 21, and 22 are fastened. Circuit elements 13, 15, 18, and 20 are usually resistances; circuit elements 14, 16, 17, 19, and 22, are condensers; and 21 is any suitable form of plate load impedance involving the element of resistance and inductance, singly or in combination, and possibly also the element of capacitance. It is seen that a total of three insulating nodes and seven conducting nodes are required. The study of a great many individual circuits or stages has shown that a large majority of them can be accommodated by three or less insulating nodes and from three to seven or more conducting nodes. Three other circuits, Figures 12, 13, and 14, substantiate this conclusion, and as stated, an analysis of all types of circuits yields the same result. This means that if a platform is provided in juxtaposition with the tube socket having three insulating nodes and about five conducting nodes, the majority of circuits, employing circuit elements supported between their terminal wires, can be accommodated. As evidenced by Figure 3, the basic form of my circuit element platform makes use of this preferred embodiment.

Figure 2B:
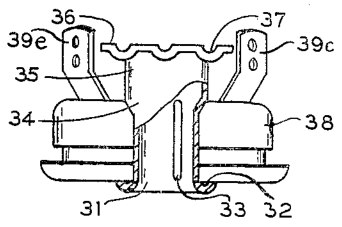
Figure 2A:
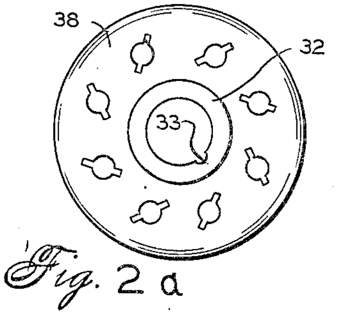

That a circuit element platform might be supported from a tube socket, I have provided the tube socket, Figure 2*b*, with a central conducting stem 31. This stem has some special features which make it particularly useful. It is generally cylindrical in shape, is a good electrical conductor, and is composed of two body portions 34 and 35 having slightly different diameters. The shank 34 is pressed into the annular cavity of the tube socket so that the stem is held in place by the shoulder formed by the large diameter portion 35, on one end, and the swaged edge 32, on the other end. The stem is provided with a keyway 33 for orienting the common type of receiving tube. In the preferred form, it may also have a fluted crown 36, the purpose of which is to engage wire conductors passing directly from one or more of the tube socket terminals 39 to the ground plane. The flutes 37 are provided for receiving one end of said conductors which are soldered in place. In the crowded central region of the socket, these flutes provide the most ready and convenient means of making direct connections to the platform stem at the base of the tube socket. The connection between platform stem and chassis, if one is made, is also accomplished by means of the fluted crown. Preferably, this connection is made to that tube socket lug which is directly grounded, ordinarily a heater lug, and the grounded socket lug is, in turn, tied to the crown via a flute.

In some forms of tube sockets, the stem might conveniently be molded into the plastic insulating body of the tube socket.

Figure 3B:
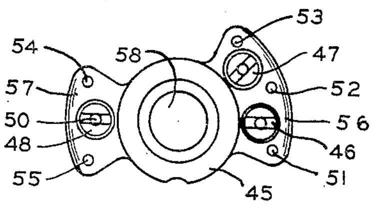
Figure 3A:
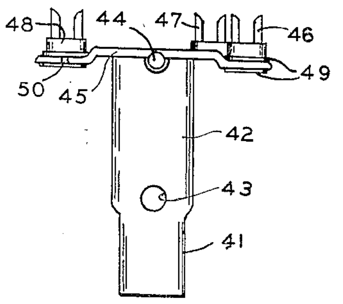

The circuit element platform, shown in Figures 3*a* and 3*b* is composed of several pieces. It has a cylindrical pedestal of conducting material 42 having a reduced diameter portion 41 of such size that it makes a sliding fit into the portion 35 of the tube socket stem. In this way the circuit element platform may be rotated in the tube socket stem, relative to the tube socket lugs or pins, until the most suitable position is found for the particular tube and circuit being used. This is one essential feature which I have provided to give my invention general utility.

In addition to the pedestal, my circuit element platform has a table 45, likewise of conducting material and this table is securely and conductively fastened to the pedestal 42. Thus, table 45, pedestal 42, and stem 31 form a continuous conducting body from the base of the tube to the extreme terminal points of the circuit elements. It is this conducting body which acts as the ground plane for the circuit in which the tube is employed. It is so shaped and arranged with respect to the tube that most ground return currents pass along a path oppositely directed to the current flow in the adjacent circuit element. This will be better seen when particular reference is made to Figures 4*a* and 4*b*.

The platform table 45 is fitted with three insulated lugs 46, 47, 48. These are used to support circuit elements from nodal points differing from ground potential, as the points 3, 4, 5 of Figure 1; 261, 262, and 263 of Figure 12; 281, 282, and 283 of Figure 13; and the points 301, 302, and 303 of Figure 14. The lugs preferred for this use are of the split-ear variety and have an annular opening 50, Figure 3*a*, of dimensions sufficient for a wire terminal of a circuit element to pass. The use of such lugs makes it extremely convenient in wiring the circuit. The circuit elements can first be fastened to the tube socket lugs leaving the other terminal wire free and generally parallel to the tube socket axis of symmetry. The circuit element platform may then be fitted into place with the free circuit element terminal wires passing through the appropriate lug openings, or the openings 51, 52, 53, 54, and 55 in the platform table. These terminal wires may then be pulled tight, crimped and soldered in place.

Each platform lug is insulated from the platform table by means of two identical insulating bushings 49. These insulating bushings have extruded portions which pass part way into the circular opening in the table, one from the top side and one from the under side. The lugs are swaged in place, and in the preferred form are arranged on a radius about equal to the radius used in placing the tube socket lugs. For octal sockets, these lugs are preferably placed 135° and 45° apart, respectively, as shown by Figure 3*b*. Using such an arrangement, I have found, as previously stated, that a large majority of tubes and circuits can be accommodated.

Figure 6:
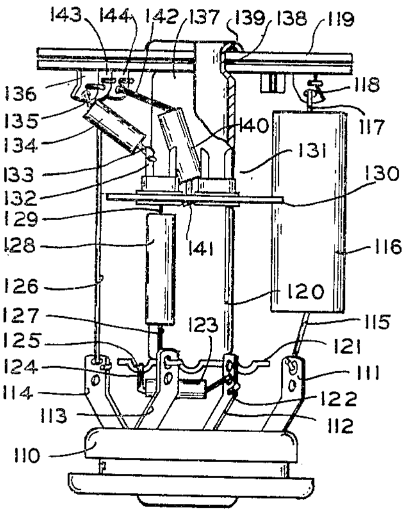
Figure 7B:
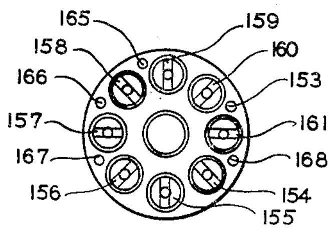

Obviously, one could use more insulated lugs in the platforms, as shown by Figure 7*b*, for example, but so doing not only increases the cost of the platforms, but there are technical disadvantages as well. In the first place, the more lugs there are, the more inaccessible will the terminal space of the tube socket become. This means that initial assembly operations, repair and experimentation, wherein circuit elements are changed, are made more difficult than necessary. Second, there are applications wherein it is convenient to mount two platforms one above the other, as in Figure 6. When this is done, it is usually necessary to have one or more circuit elements fastened between the tube socket and second platform. To meet this contingency it is desirable to have open spaces in the first platform table for the passage of said circuit elements.

Another feature of my circuit element platform is that the annular space 58 within the pedestal 42, Figures 3*a* and 3*b*, is designed to hold a circuit element, particularly a screen grid or cathode by-pass condenser. To this end, the pedestal is made as large in diameter as possible and is fitted with two circular openings 43 and 44. The latter is made sufficiently large to hold a terminal wire, while the opening 43 is made sufficiently large to permit a small insulated terminal to be fitted in place. Several such terminals are now available on the market, and those of the Kovar-glass variety which have a small metal tube for the terminal are particularly suitable. Using this type of terminal, the by-pass condenser is placed in the pedestal cavity with one terminal wire projecting through hole 43, and the other through hole 44. The wire going through the latter is pulled tight and soldered to pedestal and table. The insulated hollow terminal, such as the Kovar-glass terminal is passed over the wire projecting through 43 and its outer ring soldered to the pedestal after being pressed into hole 43. The wire terminal of the circuit element is then pulled tight and soldered to the hollow tube of the insulated terminal through which it passes.

This feature in my circuit element platform provides a by-passing arrangement of great versatility. Many sizes and types of condensers now on the market can be accommodated by a single type of platform. At the same time, such a by-passing arrangement is practically inductance free when the tube lug to be by-passed is connected to the terminal passing through 43, and the grounded tube lugs are connected to the crown 36 of the tube socket stem.

Another feature of my circuit element platform and tube socket is that it extends the shielding, usually provided inside pentodes and other high gain amplifiers, to external portions of the circuit. The tube pins, lugs and circuit elements diametrically opposite each other are well-shielded, while those parts closer together have somewhat poorer shielding. Usually, the grid and plate of a high gain tube terminate on pins that are diametrically opposite, or nearly so. But even when this is not the case, the shielding is improved by the presence of the conducting pedestal, moreover, the circuit elements can usually be mounted between platform and tube lugs in a manner that will improve the shielding.

It will also be noted that my circuit element platform, being composed largely of conducting material held at reference potential, provides a conductive guard for each insulated node or lug. Thus, currents leaking through or across the insulation flow to "ground" rather than to a neighboring node. This feature is of particular importance in humid climates and/or extremely high impedance circuits.

Figure 4B:
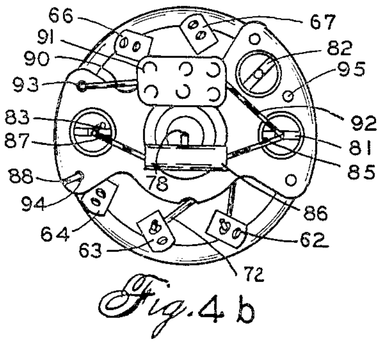
Figure 2C:
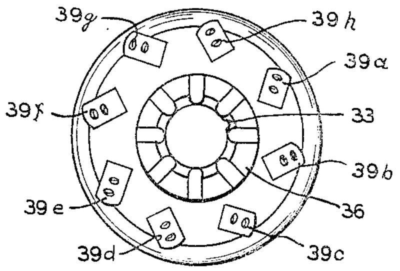
Figure 4A:
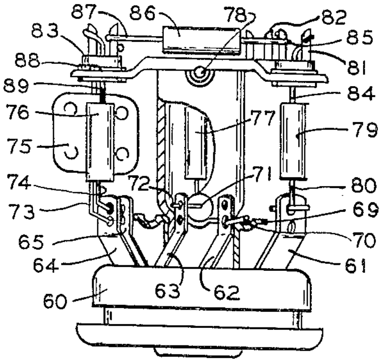

Figures 4*a* and 4*b* illustrate in detail the variety of ways circuit elements can be mounted and interconnected on the platform and between platform and tube socket. In this drawing, 60 is the insulating tube socket body, 61 to 68, inclusive, are the tube socket lugs, 69 is the crown of the tube socket stem, 70 is a conductor connecting lug 62 to the crown. 72 is the terminal conductor of by-pass condenser 77, placed inside the platform pedestal, which connects to socket lug 63 after passing through insulator 71. The latter fits into the hole 43, of the stem as shown in Figure 3*a* and is soldered to the stem if it has a fused metallic ring; if not, it may be fastened to the stem by means of a suitable adhesive; or insulator 71 may simply be a small grommet. The upper terminal 78 of the by-pass condenser is soldered or otherwise conductively fastened to the platform pedestal near the table.

On the left-hand side of the socket and platform, as shown in Figure 4*a*, 73 is a terminal conductor of circuit element 75 which fastens to socket lug 64, while 88, the other terminal wire of 75, conductively fastens in hole 94 of the conducting table. Circuit element 76 fastens between tube socket lug 64 and platform lug 83 by means of terminal wires 74 and 89, respectively. On the right hand side of the platform and socket, circuit element 79, using terminal wires 80 and 84, is fastened between socket lug 61 and platform lug 81, respectively. Across, the top of the table, circuit element 86 is fastened between platform lugs 83 and 81 by means of terminal wires 87 and 85. Similarly, circuit element 91 is fastened between platform lug 81 and platform hole 93, using terminal wires 92 and 90, respectively.

It will be noted that the circuit elements most critical in the operation of the circuit lie inside the pedestal or adjacent to the pedestal's external surface. All of these critical elements are arranged to have current flow parallel to the axis of the pedestal. Supposing that current flows out through the circuit elements, the return current flows back along the pedestal in an opposite direction so that the space occupied by the circuit element is essentially field-free over the frequency ranges being considered. That this is so is easily seen when the remote end of the circuit element is grounded directly to the table. It is equally true when the remote end of a circuit element is by-passed to the table by means of a condenser. In this instance, the by-pass condenser lies parallel and adjacent to the table so that the space occupied by it is also essentially field-free. The return current then passes from table to pedestal to stem to tube socket lug, as before described.

Figure 6 illustrates the use of two platforms in tandem and in addition to Figures 4*a* and 4*b* represents various other possible arrangements and connections for circuit elements between platforms and tube sockets. 110 is the insulating body of tube socket having tube pin contact lugs 111 to 114, etc., embedded in it. As before, this socket is equipped with a conducting stem and crown 121 which holds the pedestal 120 on which the conducting table 130 is mounted. This table is equipped with insulating lugs 131 and 132 and a number of contact holes of which 141 is an example. Above the conducting table 130 a second table 119 is mounted by means of a second pedestal 137 which fits into the top of pedestal 120, making a conducting joint therewith. Table 119 is preferably an insulating table and is equipped with a number of terminal lugs 118, 136, 143, 144, etc. One form which this table may take is that of a wafer socket. This permits the complete removal of the tube and circuits as a sub-assembly, without unsoldering more than one or two wires. At the same time, it serves as the support and termination of additional circuit elements. All connections to tube socket and circuit, except those of the signal channels in high frequency applications, may be made through the wafer socket. In operating condition, a plug carrying the essential wires is plugged into the wafer socket; to remove the entire sub-assembly, this plug is pulled out, the signal leads are unsoldered, and the main tube socket is unfastened from the chassis.

In the above referenced figure, 116 is a circuit element of large physical size fastened between the tube socket lug 111 and wafer table lug 118 by means of conducting leads 115 and 117 respectively. 123 is a circuit element of small physical dimensions fastened between tube socket lug 112 and crown groove 125 by means of wire terminals 122 and 124. 126 is a simple conductive connection passing between tube socket lug 114 and wafer table lug 143, such as a filament or heater connection. 128 is a circuit element conductively supported by its wire terminals 127 and 129 between tube socket lug 113 and conducting platform lug 132. In turn, 134 is a circuit element having terminal wires 133 and 135 connecting insulating lug 132 and wafer platform lug 136. Circuit element 140 joins wafer platform lug 144 and conducting platform hole 141.

It is to be noted that the second platform table might in many applications simply be a replica of the first table. These tables can have any suitable orientation with respect to each other and to the tube socket.

As with the simple platform arrangement of Figures 4*a* and 4*b*, all vital circuit elements are so placed that current return paths through table and stem are adjacent and parallel to the current paths in the circuit elements and oppositely directed. At the same time, the conducting ground plane of table, pedestal and stem is isolated from the chassis and may remain so, or may be grounded to the chassis at any chosen spot.

Figure 5B:
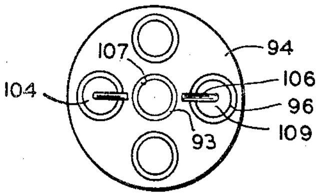
Figure 5A:
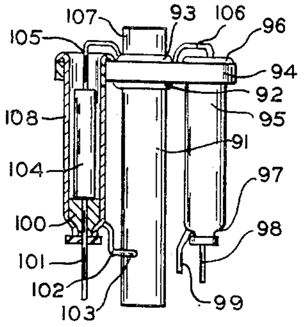

Figures 5*a* and 5*b* show an alternative form of circuit element platform in which the current return path for a circuit element is provided by a cylindrical tube or cup which almost completely encloses the circuit element. 91 and 107 are the lower and upper developments of the central stem or pedestal supporting platform 94 from a suitable tube socket. The platform may be of conducting or insulating material as the application demands. In the present instance insulating material is being used. 95 and 108 are two of several individual current return and shielding tubes which are supported from platform table 94 and in which circuit elements are placed. 104 is a typical circuit element having wire terminations 101 and 105. The latter is soldered to the shielding and current returns tube 108 at the top. The former feeds through an insulating grommet 100 at the base of tube 108 and connects to a vacuum tube socket lug, not shown. The return path from the sheathing tube 108 may be carried to the pedestal via conductor 102 and thence to an appropriate vacuum tube terminal; or the current return path may be carried direct to a tube socket terminal via conductor 99 paralleling conductor 98 which connects to some other tube socket terminal.

The present arrangement, while similar in principle to those previously described ideally illustrates the basic principles upon which my invention is founded. The unwanted accessory impedances are caused to assume a symmetrically distributed arrangement of minimum value, while the wanted circuit element impedance retains a bulk form. As illustrated throughout the body of this disclosure, there are a variety of physical forms which can be used for the support and interconnection of circuit elements which accomplish or approach the accomplishment of this ideal result. In general, the ideal container or supporting framework for circuit elements will be the one which provides field-free space between two points, measuring the extremities of the circuit element, when the circuit element is replaced by a conducting central path of equivalent dimensions. For structures shorter than a quarter wave-length, this condition is best met by a coaxial or semi-coaxial arrangement of cylindrical conducting paths of the shortest possible length. Except for end terminations, the complete coaxial arrangement of conducting paths is provided in Figure 5*a* for all circuit elements, and in Figure 4*a* for the central circuit element 77. A semi-coaxial arrangement is provided for other circuit elements of Figure 4*a*.

From a theoretical view point the second best mechanical structure for supporting a circuit element between a pair of terminal lugs, in a manner that will minimize accessory impedances, is probably an infinite conducting plane; this is, a plane sheet of conducting material of dimensions large compared with the circuit element. When a circuit element is mounted on insulating lugs in proximity to such a sheet of material, the accessory impedances associated with the circuit element will, in general, have a minimum value. There are, however, many practical and technical reasons why an "infinite conducting plane" is not a suitable structure for supporting circuit elements used by electronic vacuum tubes.

In the first place, the "infinite plane" to be most effective should be parallel to the axis of the tube structure, and this is a decidedly inconvenient arrangement if the "infinite plane" is large enough to act as such. If the conducting plane is reduced to a reasonable size, it can no longer be considered infinite, and the edges may produce unwanted effects. In any event, the smooth surface of a central cylindrical pedestal is nearly as effective in reducing accessory impedances as is a finite conducting sheet type of pedestal. At the same time, the cylindrical pedestal provides an ideal situation for at least one circuit element; too, it blends into the cylindrical geometry of the tube structure much better than a plane sheet. However this may be, I have used plane-sheet type of platforms for supporting circuit elements from vacuum tubes and found them decidedly beneficial, as compared with the usual random methods now used in supporting said circuit elements.

Figure 7A:
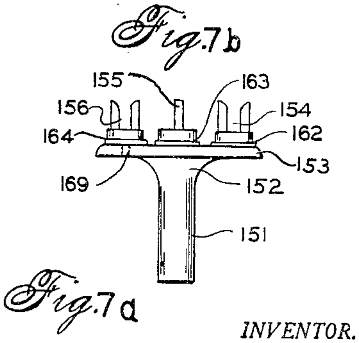

Another problem to be met in the plane sheet type of platform, and to a lesser extent in other types of platforms as well, is that of terminations. For the plane sheet type of structure to be effective it should in reality be infinite, and so should the circuit element be of infinite extent. This being impossible, platform and circuit element must both terminate abruptly and occupy as little space as possible. As a result, the terminations of platform and circuit element greatly add to the accessory impedances and, in fact, will usually be responsible for the greater portion of said impedances. The real problem then is to provide platform structures which do not have abrupt edges or changes in shape and which permit the fastening of circuit elements between them and the tube socket in such a way as to give the least abrupt change in the accessory impedance structure at the terminations as possible. Such a structure is that of Figures 7*a* and 7*b*.

Platform, pedestal and table compose a continuous cylindrical surface beginning with a tubular shape of small radius 151, passing through a conical portion of increasing radius 152 until a flat table top 168 perpendicular to the cylindrical axis is formed, and terminated in a gently rolled-over edge 153. Insulated lugs 154 to 161, inclusive, are fastened to the platform, preferably in the flat table-top region 168, and conducting holes, of which 165, 166 and 167, are typical are provided between the insulated terminal. With this platform, the circuit elements fastened to each terminal of a tube socket may readily be supported from an insulated terminal at the remote end or may be conductively fastened to the platform by means of the conducting holes provided. The insulated lugs are preferably of the type used in Figure 4*a* and have the central opening 169 through which the remote terminal of the circuit element can pass.

This type of platform is ideal from many view points. It possesses the geometrical features essential to minimizing accessory circuit element impedances and at the same time provides a convenient and economical means of mounting circuit elements.

Figures 11*a* and 11*b* illustrate another form which the circuit element platform can assume, a form which also fulfills the geometrical requirements necessary in minimizing circuit element accessory impedances. It consists of a group of semi-cylindrical cavities 238 to 245 inclusive, formed of a body 233 of conducting material also of essentially cylindrical form and having a central cylindrical cavity 223 by means of which it can be supported from the conducting central stem of a tube socket. Two typical circuit elements, 229 and 230, are shown mounted in position. Terminal 227 of 229 is conductively fastened to tube socket lug 224 while terminal 231 is shown conductively fastened to the central conducting terminal 234 of an insulating type of lug. This lug has an outer metallic ring 235 which can be soldered or otherwise fastened to the body 233 at the top of groove 245. This fastening ring is fused or otherwise fastened to insulating material 236 which, in turn is fused or fastened to the central conducting feed-thru lug 237. Such lugs are commercially available in several forms.

Terminal 228 of circuit element 230 is conductively fastened to tube socket lug 226, while terminal 232 is conductively fastened to the conducting platform via groove 247. Other such grooves, as 241 to 246, inclusive, are provided. Conducting grooves, as 254, are also provided at the base of the pedestal for the direct grounding of tube socket lugs to the pedestal, and for the grounding of pedestal to chassis, or for the interconnection of pedestals. These grooves serve the same purpose as the crown grooves of Figures 2*b*, 4*a* and 6.

Figure 8:
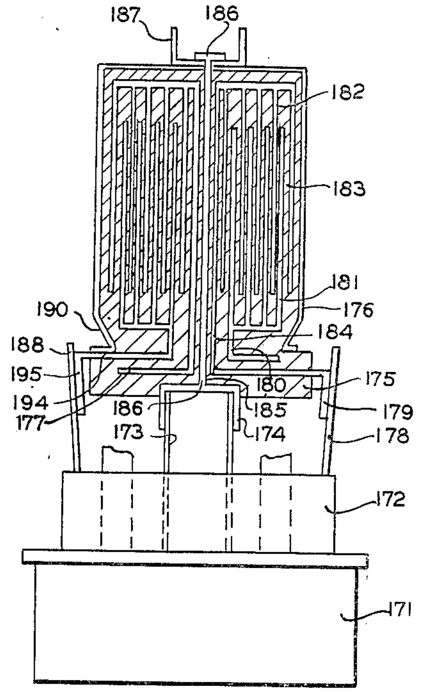
Figure 8 shows in half-section a condenser pedestal used to support circuit element platforms—from tube sockets.
Figures 9, 10:
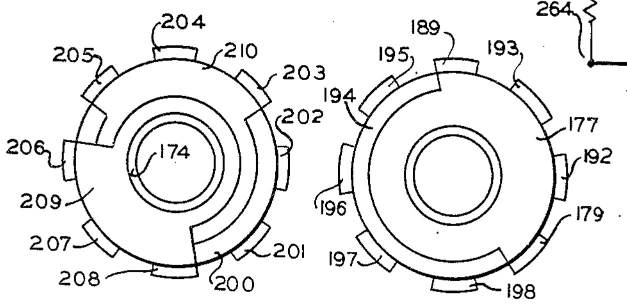
Figure 9 is a plan view at the base of the condenser pedestal showing one terminal arrangement.
Figure 10 is a plan view at the base of the condenser pedestal showing an alternative terminal arrangement.

Figure 8 is a functional drawing which shows a condenser type of pedestal used in conjunction with a miniature, or other type of tube socket, and a suitable platform table, for the support of circuit elements. It is generally cylindrical in form, is mounted on the tube socket stem 173 by means of the collar 174, and provides a low inductance by-pass connection between any chosen pair or set of tube socket terminals. The terminal arrangement at the base of the condenser pedestal is best shown in Figure 9. It consists of two terminal plates 177 and 194 having sets of terminal ears or lugs 179, 192, 193, 189 and 195, 196, 197, 198, respectively. These sets of terminal plates are insulated from each other and are internally connected to the condenser foils 181 and 182, Figure 8, respectively. The terminal lugs are so arranged and spaced that they fit just inside of and adjacent to the tube socket lugs. Suitable lugs may then be chosen for by-passing, while the remaining lug ears may be removed. Alternatively, the remaining terminal ears may be used to join two or more tube socket lugs together, for example, suppressor and cathode.

The condenser foils 181 and 182, Figure 8, are suitably insulated from each other by the insulation 183. This, or other insulation likewise insulates the foil assembly from the container 176. The latter is conductively fastened to collar 187 by means of the riveted head of the central conducting stem 186, an extension of collar 174. Thus collars 174, 187, stem 186, and external container 176 represent a continuous conducting surface which is usually grounded and which may be connected to one condenser terminal or the other. 184 is a tubular conductor, concentric with 186, which joins the foils 182 and terminal plate 177. Foils 182 are all bridged together at the top while foils 181 are bridged together at the bottom and connected to terminal plate 194 by means of the conducting yoke 180. 185 is an insulating sleeve separating 184 and 186. 175 is a block of insulating material at the base of the material which holds the terminal plates of the condenser assembly. The external container 176 has a crimped edge 190 which holds 175 in place. 172 is the insulating body of the tube socket and 171 represents the metal shell of the tube socket.

Figure 10 shows an alternative arrangement of condenser terminals which may be suitable in some applications. 201 and 202 are a pair of terminal lugs attached to terminal plate 200 which, in turn, is connected to one condenser foil. 203, 204 and 205 are three terminal lugs attached to terminal plate 210 which is connected to the other condenser foil. 206, 207 and 208 are terminal lugs attached to plate 209 which is electrically connected to collar 174. It thus becomes possible to bridge the condenser across two tube socket terminals and at the same time short two or three other tube socket terminals together while keeping them electrically isolated from the condenser and tube socket terminals to which the condenser is fastened.

In a slightly modified form of this bridging arrangement, I provide insulation between terminal plate 209 and collar 174. It is then possible to short two or more tube socket lugs together without their being electrically connected to any part of the condenser pedestal. Indeed I have found a simple bridging assembly, consisting of a terminal plate, such as 209, having terminal lugs such as 206, 207 and 208, collars such as 174 and 187, insulating material being interposed between collars and terminal plate, and the whole riveted together by means of the central stem continuation of 174 having rivet head 186, as in Figure 8, to be very useful in shorting certain tube socket terminals together and as a foundation unit for circuit element platforms.

It is to be noted that the relative positions and orientations of the terminal lugs of Figures 9 and 10, and their derivatives, may be varied to suit any purpose at hand. The illustrations used were made as straight-forward as possible to aid the description of the principles used.

The remaining drawings Figures 12, 13 and 14 are included, as already indicated to shown typical circuit examples requiring a group of three insulating platform lugs, and four or more grounding holes. Figure 12 is a multivibrator circuit using a twin triode. 261, 262 and 263 are insulated nodes requiring the use of insulating terminal lugs for the support of circuit elements 268, 272, 269, and 273, respectively. 264, 265, 266 and 267 are conducting nodes required for the support of circuit elements 271, 274 and for the connection of the cathodes. Here and elsewhere, the term node is sometimes for convenience used in a slightly different sense than found in strict circuit analysis. It is used to describe conducting joints whether each is a separate circuit node or not. In Figure 12, 261, 262 and 263 are true individual circuit nodes, but 264, 265, 266 and 267 compose together but a single circuit node.

Figure 13 shows the use of a duo-diode triode tube as a second detector and first audio amplifier. This is a circuit having three insulated nodes 281, 282 and 283 for the support and interconnection of circuit elements 289, 293, 294, 291, 297, and 296, respectively. 284, 285, 286 and 287 are conducting nodes or joints required for the support and interconnection of tube cathode and circuit elements 288, 292, 289, 295 and 291, respectively. Tube socket and other circuit components of large dimensions which are usually fastened directly to the chassis, such as the I.-F. transformer 298 and volume control 295, provide the other circuit element connections and points of support.

Figure 14 is a typical mixer circuit using tube 300 and requiring insulated nodes 301, 302 and 303 for the support and interconnection of circuit elements 311, 318, 317 and 314, respectively. This circuit also has three conducting nodes or joints 304, 305 and 306 for the support and interconnection of circuit elements 309, 316, 310, 315, 311 and 307. Other circuit element support points are provided by tube circuit and the large circuit elements and circuit element assemblies.

While the various types of circuit element platforms have been described as adjuncts to electronic-vacuum tube sockets, platform and tube socket may obviously be combined into a single unit. The platforms have each been designed considering the tube as a part of the complete structure, and the geometry adopted was that which in the most practical way, considering other desirable features, reduced the accessory impedances of circuit elements, as observed between tube socket lugs and other points of attachment, to minimum values leaving the bulk values, features and properties of the circuit elements to be freely chosen. At the same time it is to be understood that circuit element platforms may be used apart from tube sockets altogether to provide field-free frameworks for the assembly of passive networks of all types wherein the platform stems, pedestals, tables may be used as conducting nodes and ground reference surfaces while the insulated lugs supported by the platforms may act as insulated nodal points. Again, while most of the platforms described have been developed for octal and miniature tube sockets, it is to be understood that the circuit element platforms have a general application to tube sockets of all shapes and sizes and numbers of terminations. Indeed circuit element platforms are applicable to any and all lumped impedance situations wherein a field-free or minimized field structure has not been provided in the circuit element itself.

I claim:

1. A mechanism for interconnecting the electrodes of an electronic tube, comprised of an electronic tube socket having an insulating body, a central conducting stem and a multiplicity of conducting lugs fixed to said insulating body and radially disposed about said central conductive stem and electrically insulated therefrom, portions of said lugs disposed to engage the terminal pins of the electrodes of said electronic tube, other portions of said lugs projecting beyond said insulating body and having openings for engaging the terminal wires of electronic circuit elements, at least two conductors rotatably mounted to said central stem of said tube socket within the ring defined by said tube socket lugs, said conductors being insulated from each other and from said tube socket stem, said conductors being interconnected by means of at least one condenser, said condenser having at least two metallic foils with at least one layer of insulation therebetween, said foils and insulation being rolled in a tight spiral about a conducting post which is the axial extension of said tube socket stem, said post being insulated from said foils, said condenser being encased in a metallic housing of generally tubular shape including an end portion remote from said tube socket and having a block of insulating material on the end adjacent said tube socket and retained by said metallic housing, said conductors being retained by said block of insulating material, at least one of said metallic foils being conductively fastened to at least one of said conductors, at least a second of said metallic foils being conductively fastened to at least a second of said conductors, said mechanism having collars on both ends, one of said collars being retained by said block of insulating material, the other of said collars being conductively fastened to the end portion of said metallic housing, said collars being electrically joined by means of said conducting post, said collar adjacent said tube socket making a sliding fit with said tube socket stem.

2. A mechanism for interconnecting the electrodes of an electronic tube, as in claim 1, said conductors having multiplicities of terminal lugs on their outer extremities with the same angular separation as said lugs of said tube socket, said conductors having such diametrical dimensions that said conductor lugs make sliding fits with said tube socket lugs.

3. A mechanism for interconnecting the electrodes of an electronic tube, as in claim 1, said collar conductively fastened to the end portion of said metallic housing forming a stem for receiving and rotatably mounting at least two other conductors.

4. A mechanism for interconnecting the electrodes of an electronic tube, as in claim 1, said collar conductively fastened to the end portion of said metallic housing forming a stem for receiving and mounting a second condenser.

References Cited in the file of this patent

UNITED STATES PATENTS

| | | |
|---|---|---|
| 1,441,212 | Cardwell | Jan. 9, 1923 |
| 1,886,657 | Duncan, Jr. et al. | Nov. 8, 1932 |
| 2,088,355 | Wehming | July 27, 1937 |
| 2,186,184 | Tubbs | Jan. 9, 1940 |
| 2,427,563 | Lovoie | Sept. 16, 1947 |
| 2,496,095 | Kallmann | Jan. 31, 1950 |
| 2,598,534 | Gordon | May 27, 1952 |
| 2,624,775 | Hughes | Jan. 6, 1953 |